(12) United States Patent
Sherwood

(10) Patent No.: US 12,460,403 B2
(45) Date of Patent: *Nov. 4, 2025

(54) CATCH BASIN SYSTEM AND CORRESPONDING WATER DRAINAGE SYSTEM

(71) Applicant: Robert Sherwood, Almont, MI (US)

(72) Inventor: Robert Sherwood, Almont, MI (US)

( * ) Notice: Subject to any disclaimer, the term of this patent is extended or adjusted under 35 U.S.C. 154(b) by 124 days.

This patent is subject to a terminal disclaimer.

(21) Appl. No.: 18/536,459

(22) Filed: Dec. 12, 2023

(65) Prior Publication Data

US 2024/0309627 A1     Sep. 19, 2024

Related U.S. Application Data

(63) Continuation-in-part of application No. 18/462,027, filed on Sep. 6, 2023, now Pat. No. 12,264,472, and a continuation-in-part of application No. 18/185,648, filed on Mar. 17, 2023, now Pat. No. 12,247,384.

(51) Int. Cl.
   *E03F 5/10*     (2006.01)
   *E03F 1/00*     (2006.01)
   *E03F 5/02*     (2006.01)
   *E03F 5/04*     (2006.01)

(52) U.S. Cl.
   CPC ............. *E03F 5/10* (2013.01); *E03F 1/002* (2013.01); *E03F 5/02* (2013.01); *E03F 5/021* (2013.01); *E03F 5/0401* (2013.01)

(58) Field of Classification Search
   CPC . E03F 1/002; E03F 5/021; E03F 5/027; E03F 5/0403; E03F 5/10; E02B 11/00; E02B 11/005; E02B 13/00
   See application file for complete search history.

(56) References Cited

U.S. PATENT DOCUMENTS

| | | | |
|---|---|---|---|
| 3,670,894 A | 6/1972 | Friedl | |
| 3,695,153 A | 10/1972 | Dorris | |
| 4,031,009 A | 6/1977 | Hicks | |
| 4,345,998 A * | 8/1982 | Graffis | E03F 5/0401 210/164 |
| 4,988,235 A | 1/1991 | Hurley | |
| 5,062,735 A * | 11/1991 | Gaudin | E02D 29/14 210/164 |

(Continued)

FOREIGN PATENT DOCUMENTS

| | | |
|---|---|---|
| KR | 102018992 B1 | 11/2019 |
| KR | 102456163 B1 | 10/2022 |

*Primary Examiner* — Frederick L Lagman

(57) ABSTRACT

A catch basin system includes an upper housing and a lower housing. The upper housing defines an upper region of a first conduit and an upper region of a second conduit. The first and second conduits are aligned along a first axis. The lower housing is removably secured to the upper housing. The lower housing defines a lower region of the of the first conduit, a lower region of the second conduit, a third conduit disposed below the first conduit, a fourth conduit disposed below the second conduit, and a sump disposed between the third and fourth conduits and below the third and fourth conduits. The third and fourth conduits are aligned along a second axis. The first, second, third, and fourth conduits are each in fluid communication with sump.

20 Claims, 18 Drawing Sheets

(56) References Cited

U.S. PATENT DOCUMENTS

| | | | |
|---|---|---|---|
| 5,529,436 A * | 6/1996 | Meyers | E03F 3/046 |
| | | | 405/118 |
| 6,112,935 A | 9/2000 | Shackelford | |
| 6,161,984 A * | 12/2000 | Sinclair | E02D 29/1427 |
| | | | 404/25 |
| 6,416,667 B1 | 7/2002 | Graves | |
| 6,669,405 B1 | 12/2003 | Rhodes | |
| 6,837,652 B1 | 1/2005 | Rost et al. | |
| 7,303,357 B2 | 12/2007 | Villarreal et al. | |
| 7,540,953 B2 | 6/2009 | Fitzgerald | |
| 7,651,297 B2 | 1/2010 | Mllareal et al. | |
| 7,661,904 B2 | 2/2010 | Maggiacomo | |
| 9,593,477 B1 * | 3/2017 | Stivers | C02F 3/327 |
| 10,323,778 B2 | 6/2019 | Rusch | |
| 10,669,708 B1 | 6/2020 | Sherwood | |
| 10,704,246 B2 | 7/2020 | Roseen | |
| 10,968,616 B1 | 4/2021 | Smith et al. | |
| 10,968,618 B1 | 4/2021 | Sherwood | |
| 10,982,423 B1 | 4/2021 | Sherwood | |
| 11,512,803 B2 * | 11/2022 | Wong | E03F 3/04 |
| 12,247,384 B2 * | 3/2025 | Sherwood | E03F 5/0401 |
| 12,264,472 B2 * | 4/2025 | Sherwood | E03F 5/10 |
| 2004/0128903 A1 | 7/2004 | Wexler | |
| 2005/0103694 A1 * | 5/2005 | Rost | E03F 5/0404 |
| | | | 210/164 |
| 2007/0177941 A1 | 8/2007 | Villarreal et al. | |
| 2008/0085157 A1 | 4/2008 | Villarreal et al. | |
| 2022/0074532 A1 * | 3/2022 | Wong | E04D 13/08 |
| 2022/0243448 A1 | 8/2022 | Peters, Jr. | |
| 2022/0299145 A1 | 9/2022 | Recchia et al. | |
| 2024/0309626 A1 | 9/2024 | Sherwood | |
| 2024/0309627 A1 | 9/2024 | Sherwood | |

\* cited by examiner

CATCH BASIN SYSTEM AND CORRESPONDING WATER DRAINAGE SYSTEM

CROSS-REFERENCE TO RELATED APPLICATIONS

This application is a continuation-in-part of U.S. application Ser. No. 18/462,027 filed Sep. 6, 2023, now U.S. Pat. No. 12,264,472, issued Apr. 1, 2025, which in turn is a continuation-in-part of U.S. patent application Ser. No. 18/185,648 filed on Mar. 17, 2023, now U.S. Pat. No. 12,247,384, issued Mar. 11, 2025, the disclosures of which are hereby incorporated in their entirety by reference herein.

TECHNICAL FIELD

The present disclosure relates to water drainage systems, particularly to water drainage systems for buildings and houses.

BACKGROUND

Runoff water may be directed away from buildings and houses via water drainages systems.

SUMMARY

A catch basin system includes an upper housing and a lower housing. The upper housing defines an upper region of a first conduit and an upper region of a second conduit. The first and second conduits are aligned along a first axis. The lower housing is removably secured to the upper housing. The lower housing defines a lower region of the of the first conduit, a lower region of the second conduit, a third conduit disposed below the first conduit, a fourth conduit disposed below the second conduit, and a sump disposed between the third and fourth conduits and below the third and fourth conduits. The third and fourth conduits are aligned along a second axis. The first, second, third, and fourth conduits are each in fluid communication with the sump.

A catch basin includes a housing and one or more ledges. The housing defines an internal cavity configured to catch debris therein. The housing also defines first and second conduit sections extending laterally outward from the housing along an upper end of the housing. The first and second conduit sections are open along the upper end of the housing. The first and second conduit sections are in fluid communication with the internal cavity. The one or more ledges protrude outward from the upper end of the housing. The one or more ledges define recesses. The recesses are configured to receive a bottom edge of a second housing to locate the second housing relative to the housing.

A catch basin includes a housing, a first pipe, a second pipe, a first pipe section, and a second pipe section. The housing defines an internal cavity configured to catch debris therein. The first and second pipes are disposed between upper and lower ends of the housing. The first and second pipes extend laterally outward from the housing. The first and second pipes are in fluid communication with the internal cavity. The first and second pipe sections are disposed above the first and second pipes. The first and second pipe sections extend laterally outward from the housing along the upper end of the housing. The first and second pipe sections are open along the upper end of the housing. The first and second pipe sections are in fluid communication with the internal cavity.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
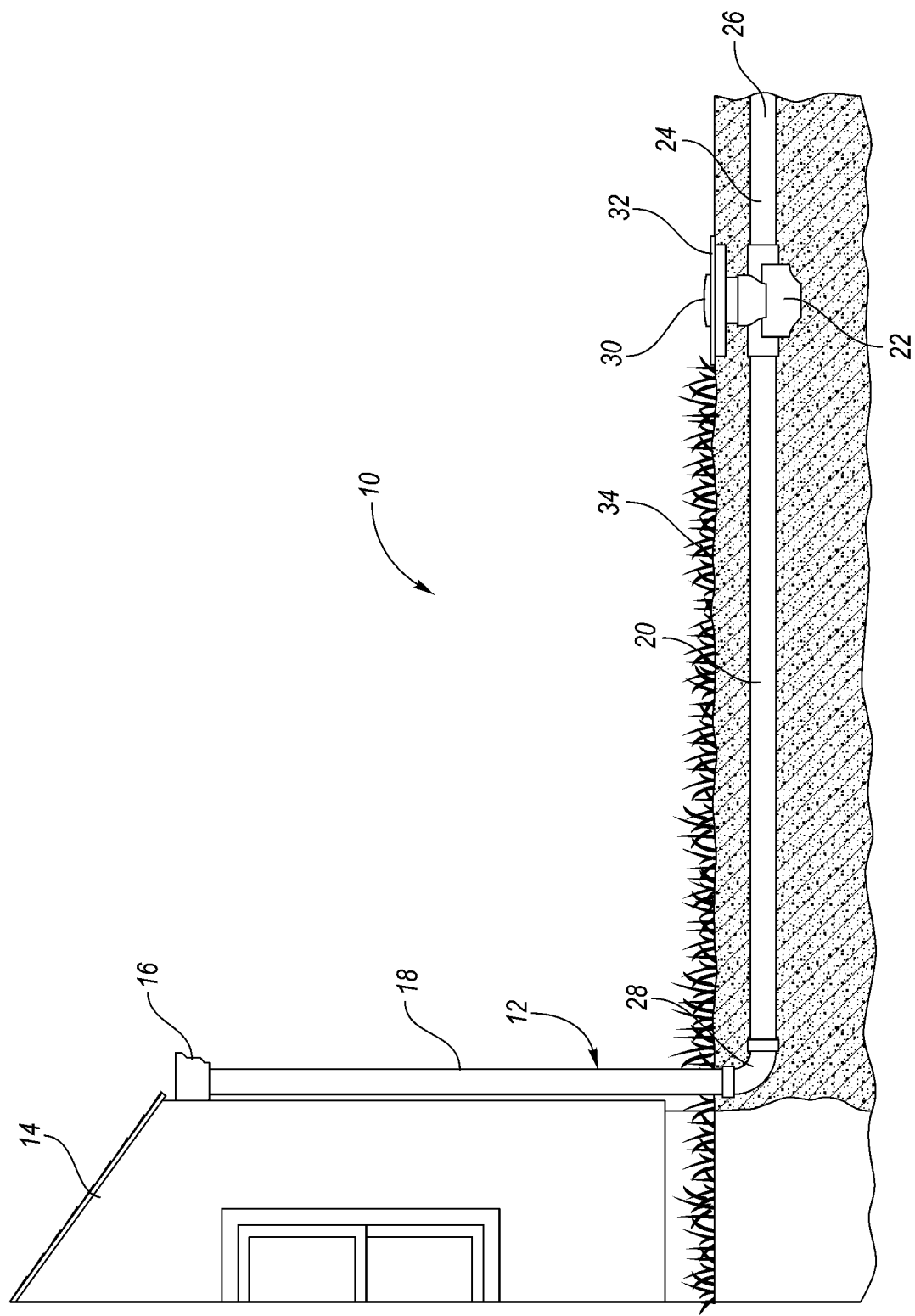
FIG. 1 is a front view of a water drainage system for a building or house.
Figure 2:
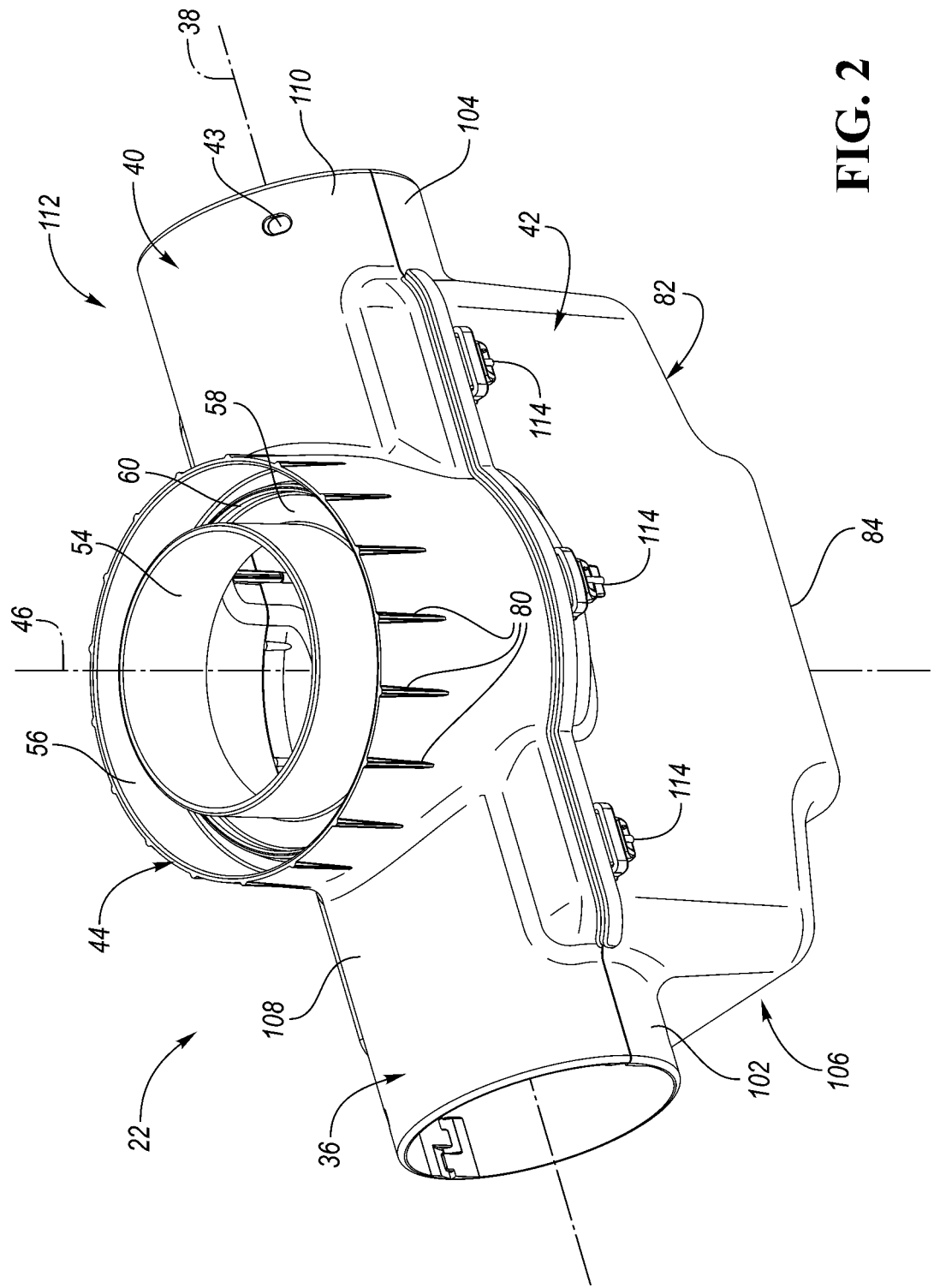
FIG. 2 is a front-top isometric view of a catch basin system.
Figure 3:
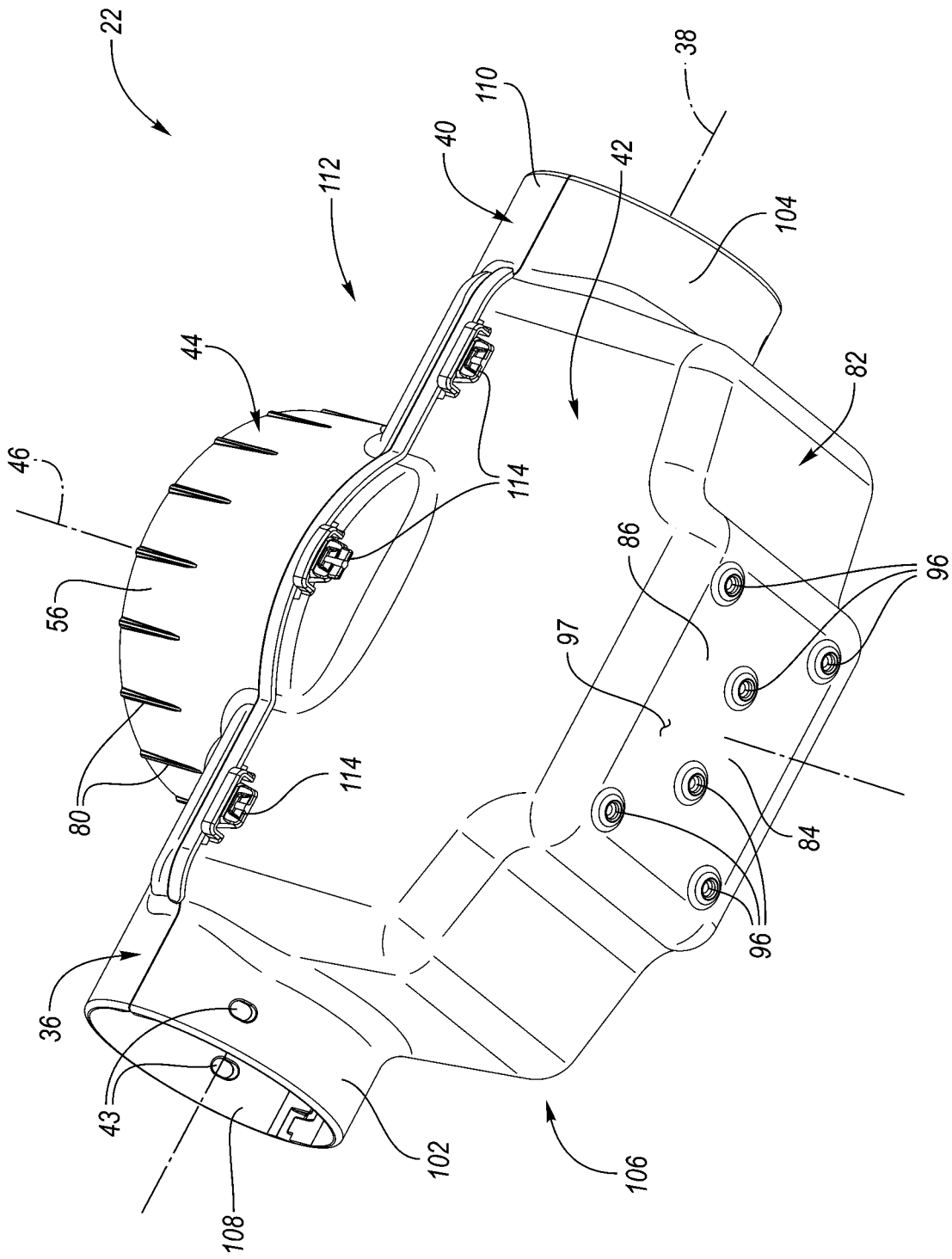
FIG. 3 is a front-bottom isometric view of the catch basin system.
Figure 4:
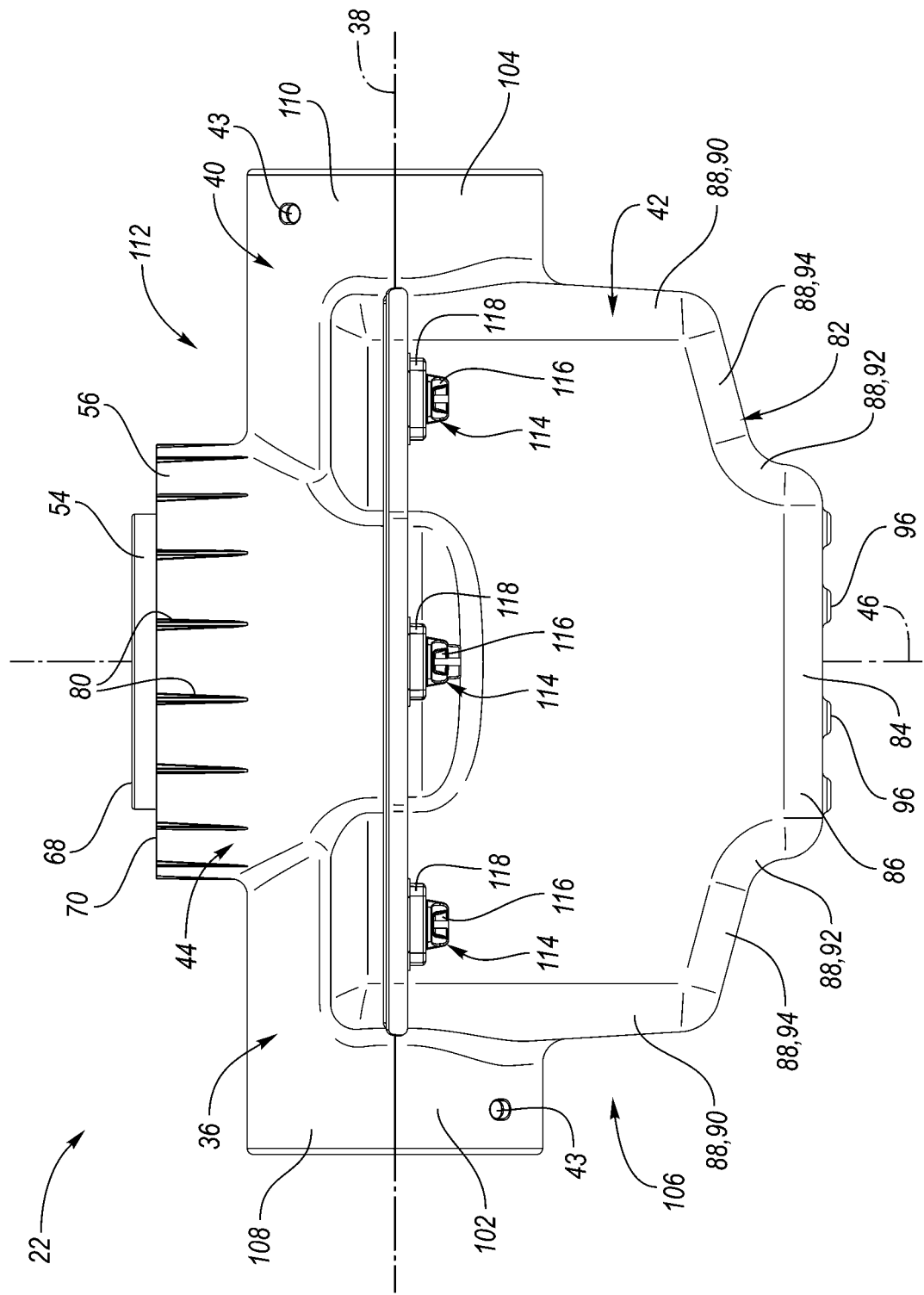
FIG. 4 is a front view of the catch basin system.
Figure 5:
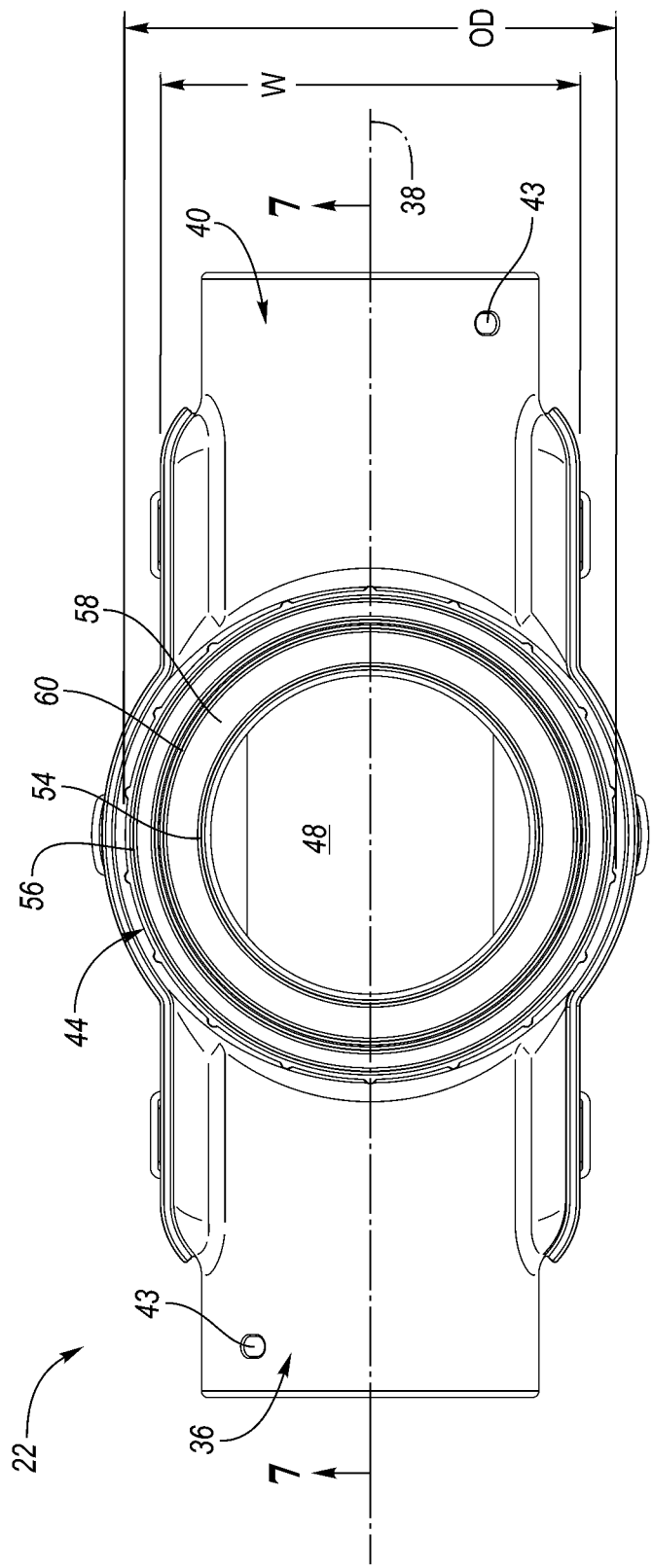
FIG. 5 is a top view of the catch basin system.
Figure 6:
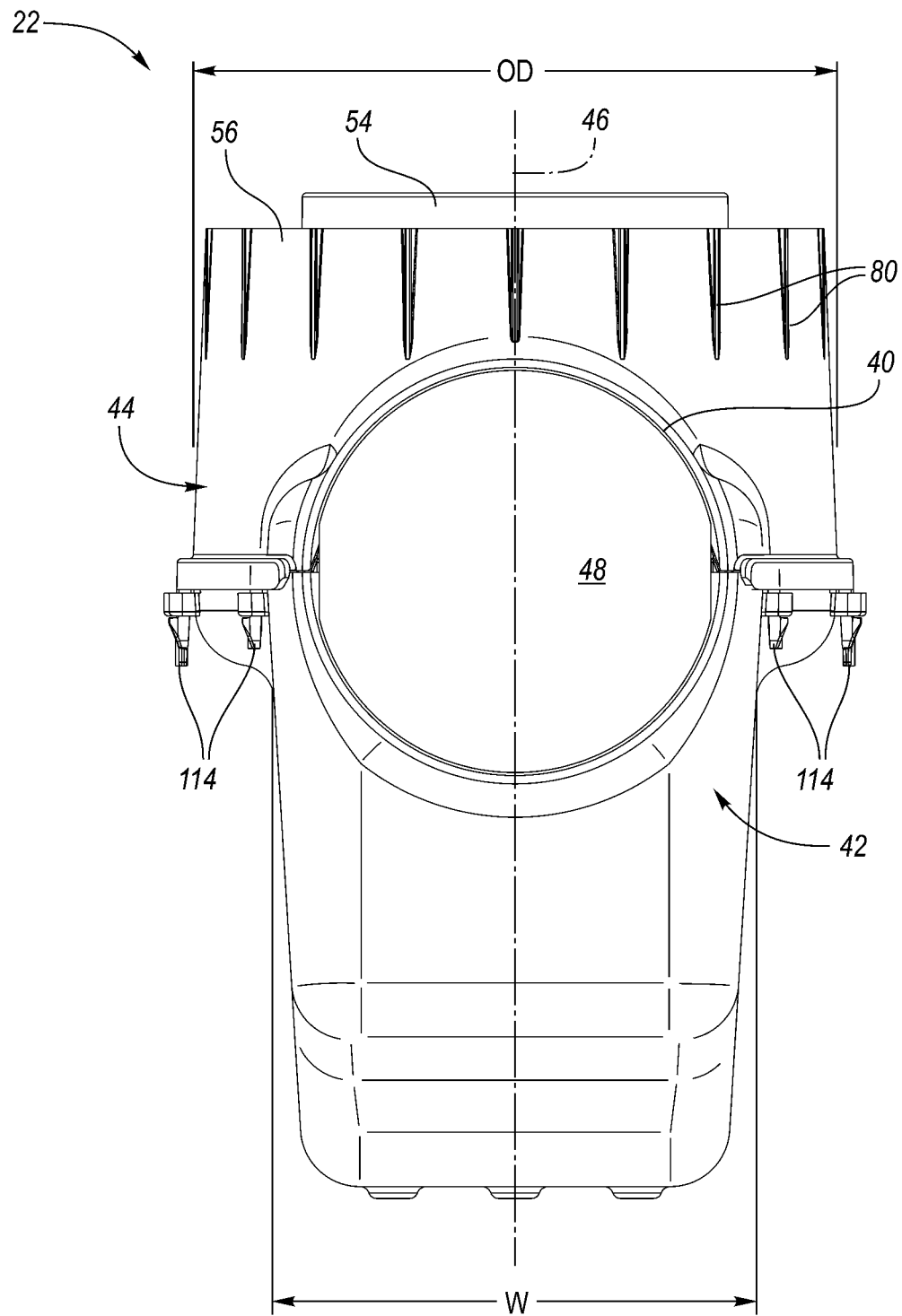
FIG. 6 is a side view of the catch basin system.

As illustrated in FIG. 1, the water drainage system 10 includes tubes, pipes, or conduits 12 that are configured to direct water away from a house or building 14. More specifically, the conduits 12 may be configured to direct water away from an cavestrough 16 that is disposed along edges of a roof of the building 14. The cavestrough 16 is configured to collect runoff water that cascades down the roof of the building 14 during rainstorms, from melting snow, or from any other source. The conduits 12 are configured to direct the water away from the eavestrough 16 and away from the building 14.

The tubes, pipes, or conduits 12 of the water drainage system 10 may include a downspout 18 that is configured to direct water downward from the eavestrough 16 to a horizontal tube, pipe, or conduit 20. The horizontal conduit 20 in turn may be configured to direct water from the downspout 18 to a catch basin system 22. The catch basin system 22 may be an in-line catch basin that is sandwiched been the horizontal conduit 20 and a second horizontal conduit 24 or some other connection. The catch basin system 22 may be directly connected the horizontal conduit 20 and second horizontal conduit 24. Alternatively, the catch basin system 22 may be connected to the horizontal conduit 20 or the second horizontal conduit 24 via intermediate components or connecting parts such as reducing couplers, elbows, corrugate tube couplers, or any other desirable intermediate component or connecting part. If no connection is desired, a plug; a solid cap or cover; or a grate or grated cover may be disposed along the horizontal ends of the catch basin system 22 where the horizontal conduit 20 and second horizontal conduit 24 are shown to be connected to the catch basin system 22 in FIG. 1. The horizontal conduit 20 and second horizontal conduit 24 may include a slight downward slope extending in a direction from the downspout 18 toward an outlet end 26 of the water drainage system 10 such that water flows from the downspout 18 to the outlet end 26 of the water drainage system 10.

The downspout 18 may be connected to the horizontal conduit 20 via a first elbow tube, pipe, or conduit 28. The horizontal tube 20 and the first elbow conduit 28 may be disposed or buried underground, which may be for aesthetic purposes or may be to prevent placing an obstacle on an area of ground that may require maintenance (e.g., the area of ground may include grass that needs to be mowed on a regular basis) or that may have a significant amount of foot traffic.

An accessing component 30 is configured to provide access to, act as an inlet to, or act as an outlet from an internal cavity defined by the catch basin system 22. The accessing component 30 could also be a plug that requires removal to provide access to the internal cavity defined by the catch basin system 22. The accessing component may be secured to an access port along the top of the catch basin system 22. The accessing component 30 may be directly secured to the access port along the top of the catch basin system 22. Alternatively, the accessing component 30 may be secured to the access port along the top of the catch basin system 22 via intermediate components or connecting parts such as a straight pipe that operates as riser, a reducing coupler, a corrugated tube coupler, or any other desirable intermediate component or connecting part. This may be required if there is a sufficient distance between the catch basin system 22 and the accessing component 30. For example, the catch basin system 22 may be buried below the ground, the accessing component 30 may be disposed above ground or at ground level, and there may be a sufficient distance between the catch basin 22 system and the accessing component 30 such that a direct connection between the catch basin system 22 and the accessing component 30 is not possible. The accessing component 30 may be a solid cap or cover; a plug, a pop-up drain emitter; a grate or grated cover; or any or any other desirable component. For example, the accessing component 30 could be an additional conduit that attaches the catch basin system to other components.

A turf cover 32 may be disposed radially about the accessing component 30. The turf cover 32 may also be disposed above and adjacent to the upper surface of the ground. The turf cover 32 may be configured to engage the ground to inhibit vegetative growth (e.g., grass 34) proximate to and radially about an outer periphery of the accessing component 30. More specifically, the turf cover 32 may cover the ground such that sunlight is unable to penetrate the ground directly below the turf cover 32, which inhibits the vegetative growth. The accessing component 30 and the turf cover 32 may both be green in order to blend in with the adjacent vegetation, or more specifically with the adjacent grass, which may be for aesthetic purposes.

Referring to FIGS. 2-10, the catch basin system 22 is illustrated in further detail. The catch basin system 22 includes a first tube, pipe, or conduit 36 that is aligned and/or extends along a first axis 38. The catch basin system includes a second tube, pipe or conduit 40 that is spaced-apart from the first conduit 36. The second conduit 40 is also aligned and/or extends along the first axis 38. The first axis 38 may be a substantially horizontal axis (i.e., the first axis 38 may extend in a horizontal direction). Substantially horizontal may refer to any incremental angle that is between exactly horizontal and 15° from exactly horizontal. At least one of the first conduit 36 and second conduit 40 may be an inlet to the catch basin system 22. At least one of the first conduit 36 and second conduit 40 may be an outlet to the catch basin system 22. The first conduit 36 and the second conduit 40 may each be connected to intermediate components or connecting parts such as a straight tube or conduit (e.g., horizontal conduit 20 and second horizontal conduit 24 in FIG. 1), reducing couplers, elbows, corrugate tube couplers (e.g., couplers 41 illustrated in FIG. 8), or any other desirable intermediate component or connecting part. If no connection is desired, a plug; a solid cap or cover; or a grate or grated cover may be secured to the first conduit 36 or the second conduit 40. The first conduit 36 and the second conduit 40 may each define lateral orifices 43 that are configured to receive pins 45 for securing such intermediate components or connecting parts to the first conduit 36 and the second conduit 40.

The catch basin system 22 also includes a basin 42 that is disposed between the first conduit 36 and the second conduit 40. More specially, the basin 42 may be disposed between outer ends of the first conduit 36 and the second conduit 40. The basin 42 extends downward from the first conduit 36 and the second conduit 40. The catch basin system 22 further includes an access port 44. The access port 44 is aligned along a second axis 46. The second axis 46 may be a substantially vertical axis (i.e., the second axis 46 may extend in a vertical direction). Substantially vertical may refer to any incremental angle that is between exactly vertical and 15° from exactly vertical. The second axis 46 may also be a substantially perpendicular to the first axis 38. Substantially perpendicular may refer to any incremental angle that is between exactly perpendicular and 15° from exactly perpendicular. The access port 44 is disposed above the basin 42. The access port 44 is disposed between the first conduit 36 and the second conduit 40. More specially, the access port 44 may be disposed between outer ends of the first conduit 36 and the second conduit 40. The access port 44 extends upward from the first conduit 36 and the second conduit 40.

The catch basin system 22 is configured to catch debris flowing within a drainage system (e.g., water drainage system 10). More specifically, the first conduit 36, second conduit 40, basin 42, and access port 44 collectively form an internal space or internal cavity 48 that is configured to catch the debris (e.g., dirt, leaves, shingle gravel, etc.) flowing within the drainage system. Even more specifically, a lower portion 50 of the internal cavity 48, which is defined by the basin 42, is configured to is configured to catch the debris flowing within the drainage system (i) due to gravity and (ii) due to the position of lower portion 50 being along the bottom of the internal cavity 48 and below an upper portion 52 of the internal cavity 48. The upper portion 52 of the internal cavity 48 is defined by the first conduit 36, second conduit 40, and access port 44. It is noted that the water may flow into and outer of the internal cavity via the first conduit 36 and second conduit 40, which partially define the upper portion 52 of the internal cavity 48, placing the lower portion 50 in an ideal position to catch debris. Internal surfaces of the internal cavity 48 that extend in different directions may be connected to each other by round surfaces (e.g., fillets) to facilitate flow through the internal cavity 48 and prevent turbulence of water flowing through the internal cavity 48.

The access port 44 may be configured to provide access to the basin 42. More specifically, access may be obtained to the lower portion 50 internal cavity 48 via the access port 44 for cleaning out the lower portion 50 of internal cavity 48. More generally, the access port 44 may be configured to provide access to the internal cavity 48 for purposes such as cleaning out the internal cavity 48. The access port 44 may alternatively operate as an inlet to or as an outlet from the internal cavity 48.

The basin 42 may have a width, W, extending in a direction that is substantially perpendicular to the first axis 38. The access port 44 may have an outer diameter OD that is substantially perpendicular to the second axis 46. Substantially perpendicular may refer to any incremental angle that is between exactly perpendicular and 15° from exactly perpendicular. The width W of the basin 42 may be smaller than the outer diameter OD of the access port 44. The width W of the basin 42 may also be positioned within the outer diameter OD of the access port 44. More specifically, the width W of the basin 42 may be positioned within a footprint the outer diameter OD of the access port 44 along the second axis 46 when viewed from a side of the catch basin system 22 (e.g., see FIG. 6). This is beneficial if the catch basin system 22 is being placed underground in a trench. For example, a typical trenching machine produces trenches that are six inches wide. The catch basin system may be configured such that the outer diameter OD of the access port 44 is six inches while the width W of the basin 42 is five inches. This allows for easy placement of the basin 42 within such a trench while allowing the outer diameter OD of the access port 44 to engage the walls of the trench for stability while the trench is being filled in around the catch basin system 22.

The access port 44 includes an inner conduit or tube 54 and an outer conduit or tube 56. The inner tube 54 is concentric with the outer tube 56. The inner tube 54 and the outer tube 56 are secured to each other by a web 58. A ring-shaped protrusion or ridge 60 extends upward from the web 58. More specifically, the ridge 60 extends upward from the web 58 at position that is between the inner tube 54 and the outer tube 56. The ridge 60 may also be concentric with the inner tube 54 and the outer tube 56. The ridge 60 may be configured to guide a cutting tool 62 (e.g., a hole saw, hole cutter, or any other cutting tool) for removal of the inner tube 54. It may be desirable to remove the inner tube 54 if a connection with the outer tube 56 is desired. On the other hand, if a connection with the inner tube 54 is desired, removal of the inner tube is not desired. For example, the inner tube 54 has been removed and a first plug 64 is illustrated as being connected to the outer tube 56 in FIG. 10. As another example, the inner tube 54 has not been removed and a second plug 66 is illustrated as being connected to the inner tube 54 in FIG. 9. It should be noted that although plugs (i.e., first plug 64 and second plug 66) are shown to be connected to the inner tube 54 and outer tube 56 in FIGS. 9 and 10, respectively, the inner tube 54 and outer tube 56 may be coupled to any desirable intermediate component or connecting part, such as a straight conduit that may operate as a riser; a reducing coupler; an elbow; a corrugate tube coupler; a solid cap or cover; or a grate or grated cover; a pop-up drain emitter; or any other desirable connecting part component.

An upper end 68 of the inner tube 54 is positioned above an upper end 70 of the outer tube 56. This provides clearance for the inner tube 54 from the outer tube 56 in the event the inner tube 54 is utilized as opposed to the outer tube 56. An inner diameter $ID_{it}$ of the inner tube 54 is configured to receive or engage an intermediate component or connecting part 72 of a first size (e.g., the second plug 66), an outer diameter $OD_{it}$ of the inner tube 54 is configured to receive or engage an intermediate component or connecting part 74 of a second size, an inner diameter $ID_{ot}$ of the outer tube 56 is configured to receive or engage an intermediate component or connecting part 76 of a third size, and an outer diameter $OD_{ot}$ of the outer tube 56 is configured to receive or engage an intermediate component or connecting part 78 of a fourth size. The outer diameter $OD_{ot}$ of the outer tube 56 may be the same as the outer diameter OD of the access port 44 as a whole. The ridge 60 may also be configured to receive or engage an intermediate component or connecting part (e.g., first plug 64). Ribs 80 may protrude from the outer diameter $OD_{ot}$ of the outer tube 56. The ribs 80 are configured to engage the intermediate component or connecting part 78 of a fourth size to secure the intermediate component or connecting part 78 of a fourth size to the outer tube 56.

A bottom 82 of the basin 42 tapers from the first conduit 36 toward a center 84 of the basin 42. The bottom 82 of the basin 42 also tapers from the second conduit 40 toward the center 84 of the basin 42. Stated in other terms the basin 42 has a flat central region 86 defined along the bottom 82 of the basin 42 and sloped regions 88 that extend upward from the flat central region 86 and toward the first and second conduits 36, 40. The sloped regions 88 may include upper sloped portions 90 extending downward from the first and second conduits 36, 40, lower sloped portions 92 extending downward to the flat central region 86, and intermediated sloped portions 94 that are disposed between the upper sloped portions 90 and the lower sloped portions 92. The grade or gradient of the intermediated sloped portions 94 may be smaller than the grades or gradients of the upper sloped portions 90 and the lower sloped portions 92 (e.g., angles between the intermediated sloped portions 94 and a horizontal plane may be smaller than angles between either the upper sloped portions 90 or the lower sloped portions 92 and such a horizontal plane).

Protrusions 96 may extend downward from a bottom surface 97 of the basin 42 along the flat central region 86. The protrusions 96 may define recessed regions 98 that extend upward. The recessed regions 98 may be configured to guide drill bits 100 for adding drain holes to the bottom surface 97 of basin 42. The protrusions 96 may also act as feet for supporting the catch basin system 22 in an upright position, which is desirable for storage and for when the catch basin system 22 is placed into use (e.g., when the catch basin system 22 is placed into a trench and connected to other portions of a drainage system).

The catch basin system 22 may be formed as several components that are in turned secured to each other to form the catch basin system 22. For example, a bottom portion 102 of the first conduit 36, a bottom portion 104 of the second conduit 40, and the basin 42 may be formed as a first integrated component 106 while a top portion 108 of the first conduit 36, a top portion 110 of the second conduit 40, and the access port 44 may be formed as a second integrated component 112.

The first integrated component 106 may be secured to the second integrated component 112 by any known attaching method. For example, the first integrated component 106 may be secured to the second integrated component 112 by fasteners, screw, rivets, clamps, clips, snaps, tabs, etc. However, specific clipping or snapping features 114 may be integrally formed into the first integrated component 106 and the second integrated component 112. Such snapping features 114 may include flexible tabs or hooks 116 that engage loops 118. The tabs or hooks 116 may be integrally formed as part of either the first integrated component 106 or the second integrated component 112 while the loops 118 may be integrally formed as part of the other of the first integrated component 106 or the second integrated component 112. The first integrated component 106 and the second integrated component 112 may be formed via a molding process such as injection molding and may be made from a material such as Polyvinyl Chloride (PVC) or other suitable material.

Referring to FIGS. 11-15, an intermediate or adapter component 120 and the catch basin system 22 with the addition of an adapter component 120 are illustrated. The adapter component 120 may be referred to as a third integrated component. The inclusion of the adapter component 120 adds an additional pair of spaced-apart aligned tubes or conduits (e.g., the first conduit 36 and the second conduit 40) that may function as inlets or outlets to the internal cavity 48. The adapter component 120 is disposed or sandwiched between the first integrated component 106 and the second integrated component 112 when utilized. Multiple adapter components 120 may be disposed or sandwiched between the first integrated component 106 and the second integrated component 112 with each additional adapter component adding an additional pair of spaced-apart aligned tubes or conduits that may function as inlets or outlets to the internal cavity 48.

With the additional of the adapter component 120, the catch basin system 22 further includes a third tube, pipe, or conduit 122 and a fourth tube, pipe, or conduit 124 that are spaced-apart relative to each other. The third conduit 122 and the fourth conduit 124 are aligned and/or extend along a third axis 126. The third axis 126 may be a substantially horizontal axis (i.e., the third axis 126 may extend in a horizontal direction). Substantially horizontal may refer to any incremental angle that is between exactly horizontal and 15° from exactly horizontal. The third axis 126 may be substantially parallel with the first axis 38. Substantially parallel may refer to any incremental angle that is between exactly parallel and 15° from exactly parallel.

Also, with the addition of the adapter component 120, the first conduit 36 and the second conduit 40, among other portions of the catch basin system 22, are reconfigured. More specifically, a bottom portion 128 of the first conduit 36, a bottom portion 130 of the second conduit 40, and the basin 42 are formed as the first integrated component 106; a top portion 132 of the third conduit 122, a top portion 134 of the fourth conduit 124, and the access port 44 are formed as the second integrated component 112; and a top portion 136 of the first conduit 36, a top portion 138 of the second conduit 40, a bottom portion 140 of the third conduit 122, and a bottom portion 142 of the fourth conduit 124 are formed as a third integrated component (i.e., the adapter component 120).

The adapter component 120 may be secured to the first integrated component 106 and the second integrated component 112 in any manner describe herein, such via fasteners, screw, rivets, clamps, clips, snaps, tabs, etc. However, the clipping or snapping features 114 described above, which include tabs or hooks 116 that engage loops 118, may be integrally formed into the first integrated component 106, the second integrated component 112, and the third integrated component (i.e., the adapter component 120) so that the first integrated component 106, the second integrated component 112, and the third integrated component may be secured to each other. More specifically, the second integrated component 112 may include tabs or hooks 116 that engage loops 118 positioned along the top of the adapter component 120 and the adapter component 120 may include tabs or hooks 116 that engage loops 118 positioned along the top of the first integrated component 106.

That addition of the adapter component 120 also increases the size of the internal cavity 48 defined by the catch basin system 22. More specifically, the adapter component 120 defines a central space that forms a central portion 144 of the internal cavity 48, which is positioned between the lower portion 50 of the internal cavity 48 and the upper portion 52 of the internal cavity 48.

Referring to FIGS. 16-19, an alternative configuration of the catch basin system 22' is illustrated. The catch basin system 22' as depicted in FIGS. 16-19, should be construed to include all of the elements, components, subcomponents, and functionality as the catch basin system 22 depicted in FIGS. 1-15, unless otherwise stated herein. The catch basin system 22' may include the second integrated component 112 and a fourth integrated component 146. The fourth integrated component 146 essentially comprises an integrated component that is a combination of the first integrated component 106 and the adapter component 120. The fourth integrated component 146 includes all of the elements, components, subcomponents, and functionality as the first integrated component 106 and the adapter component 120 unless otherwise stated herein.

Figure 11:
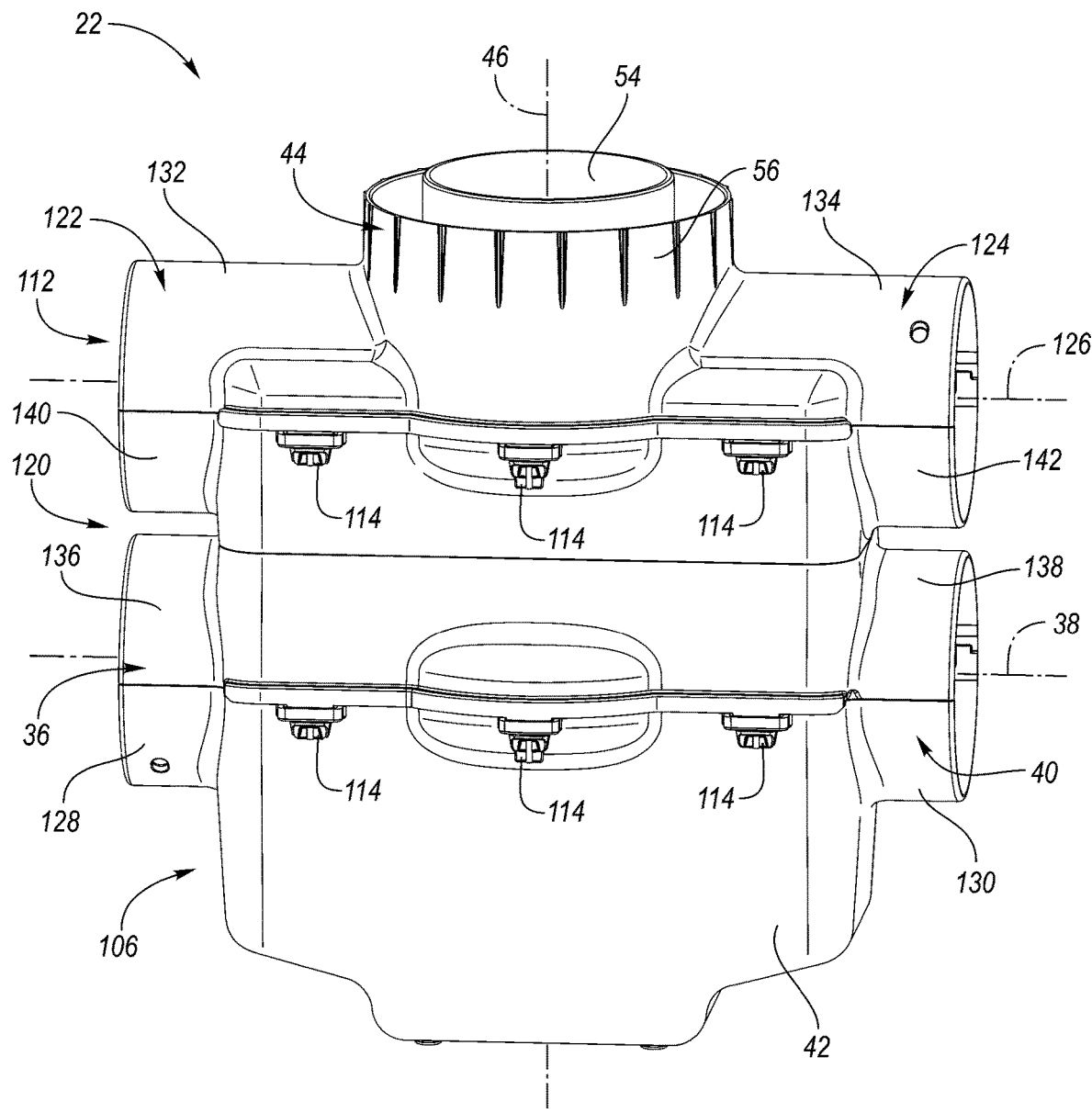
FIG. 11 is a front-top isometric view of the catch basin system with the addition of an adapter.
Figure 12:
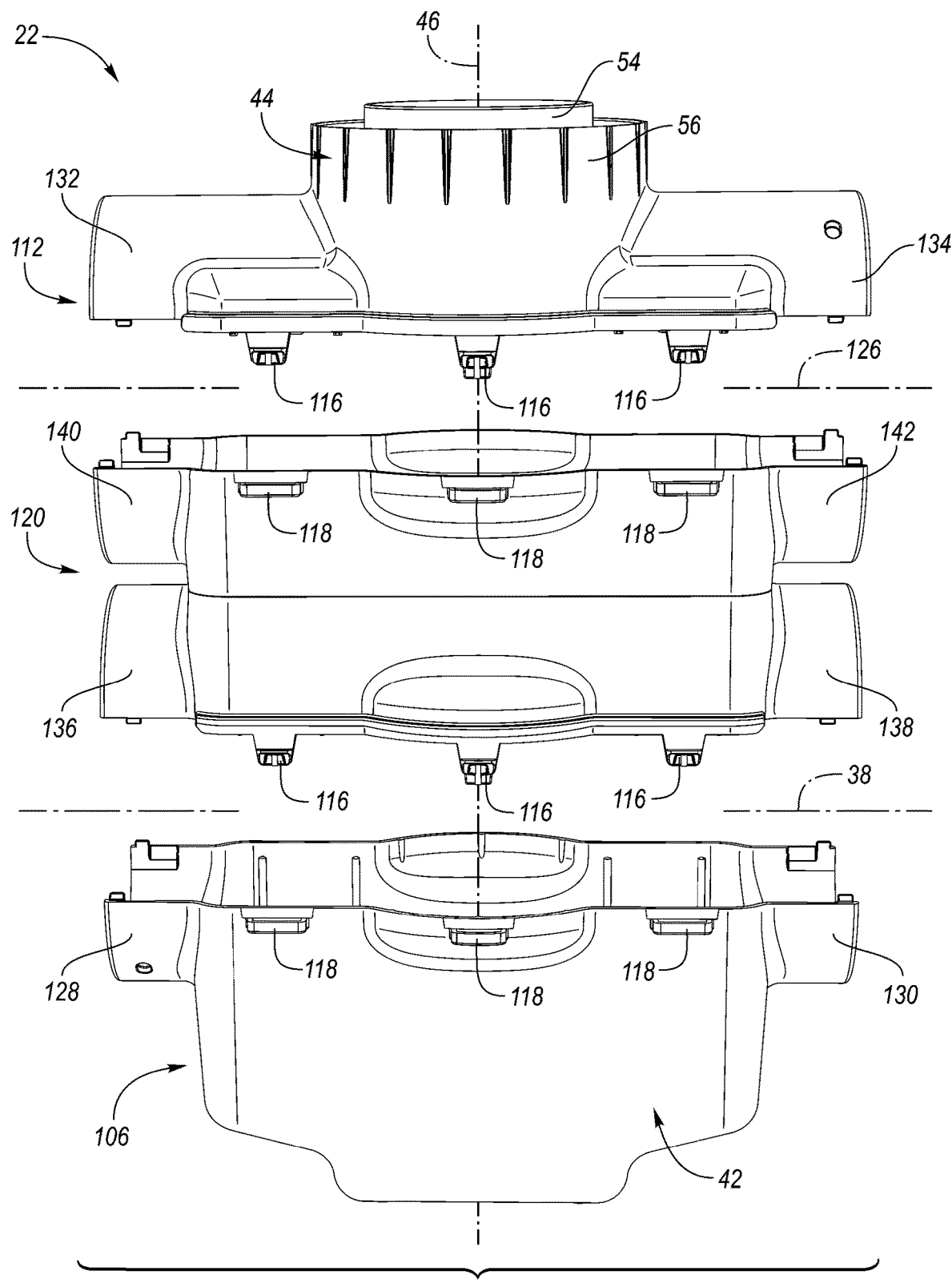
FIG. 12 is an exploded view the catch basin system including the adapter.
Figure 13:
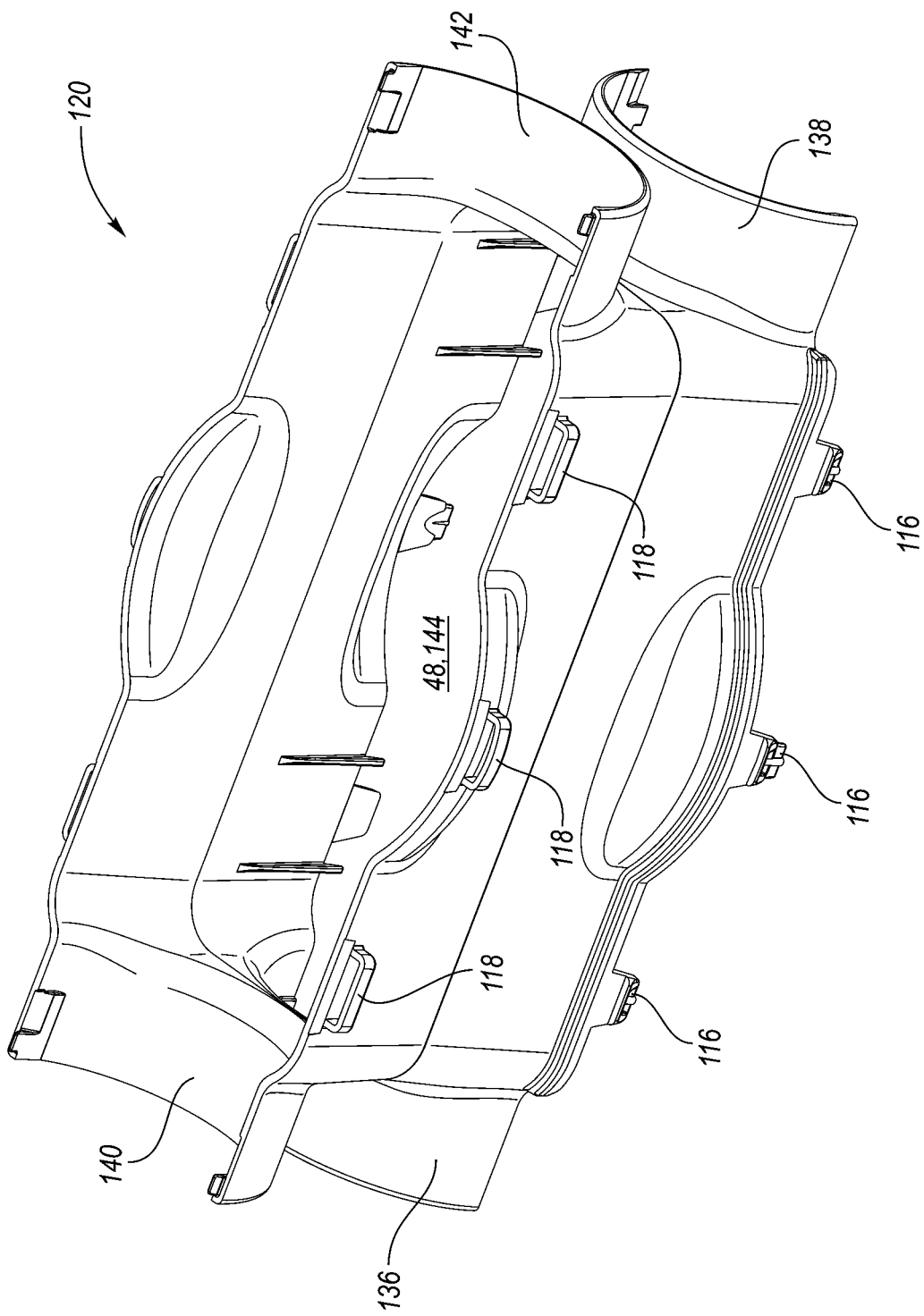
FIG. 13 is a front-top isometric view of the adapter.
Figure 14:
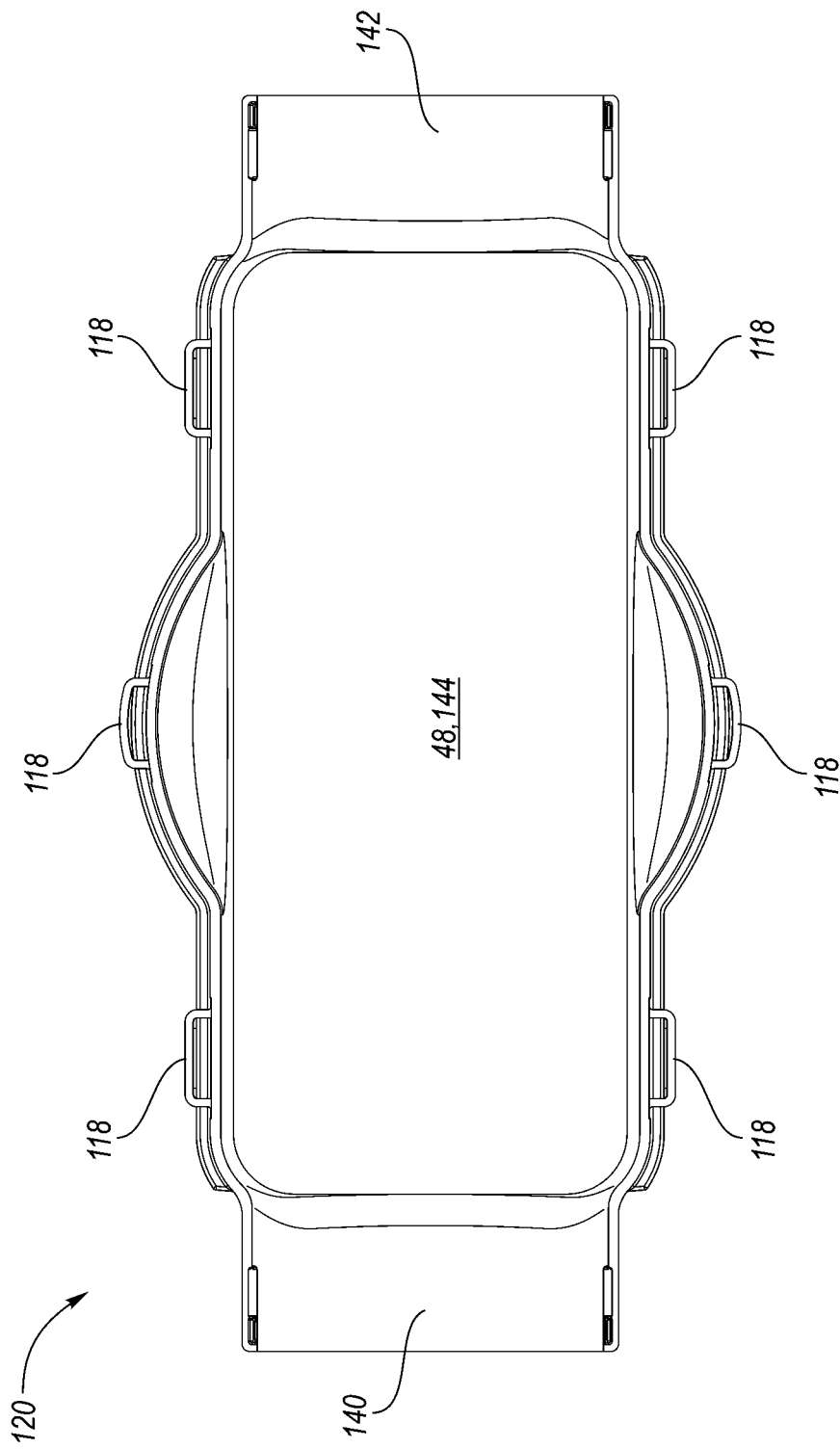
FIG. 14 is a top view of the adapter.
Figure 15:
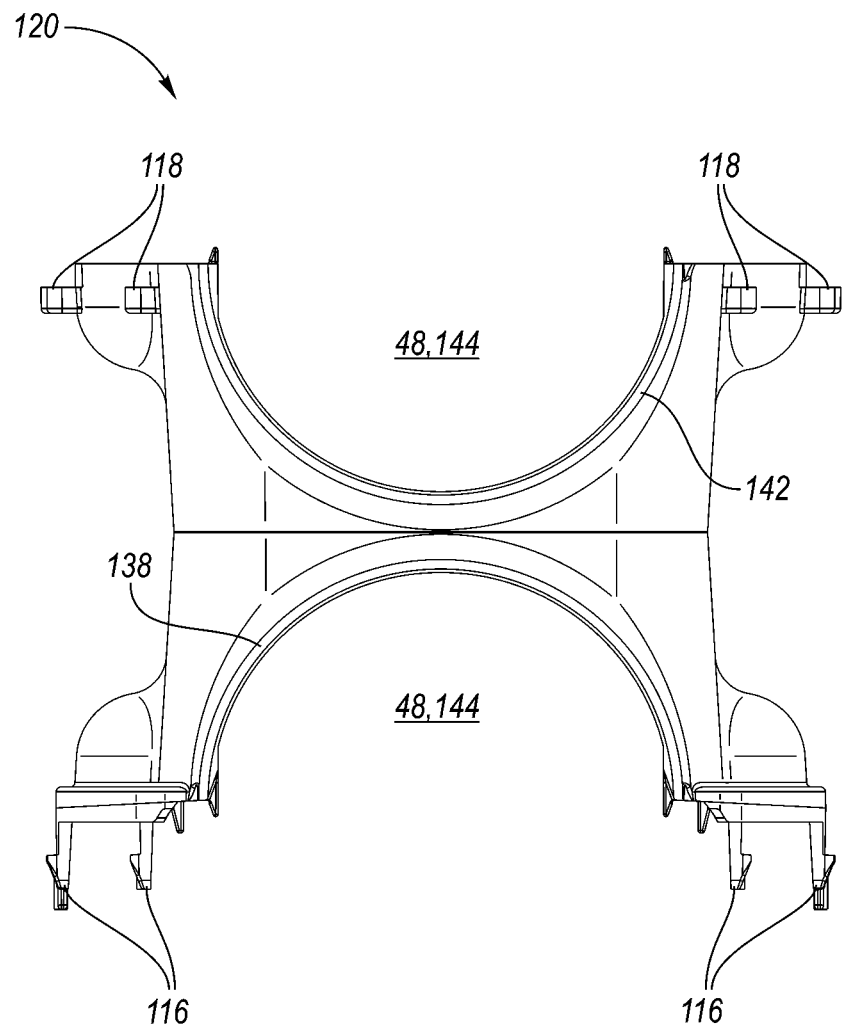
FIG. 15 is a side view of the adapter.
Figure 16:
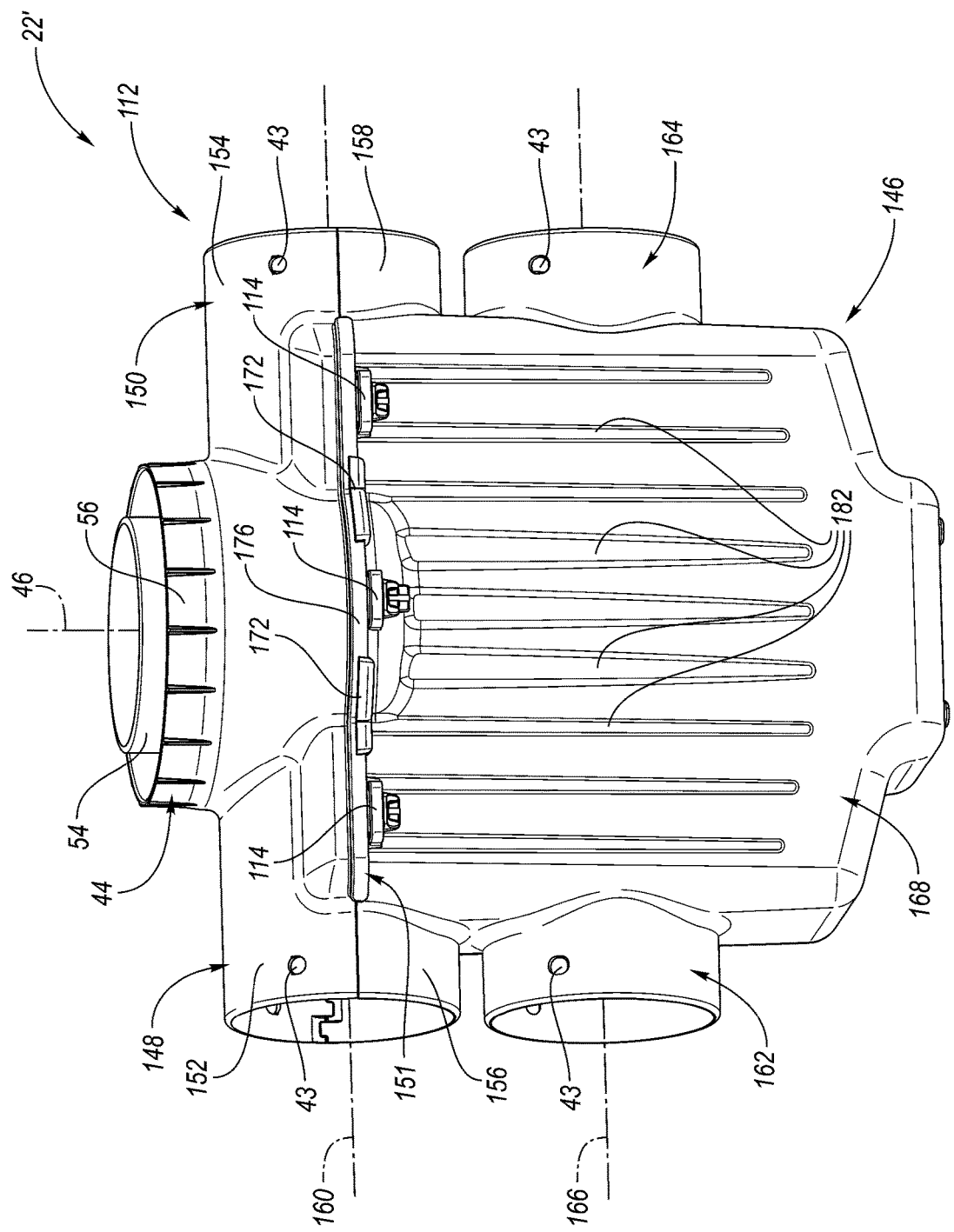
FIG. 16 is a front-top isometric view of an alternative configuration of the catch basin system.
Figure 17:
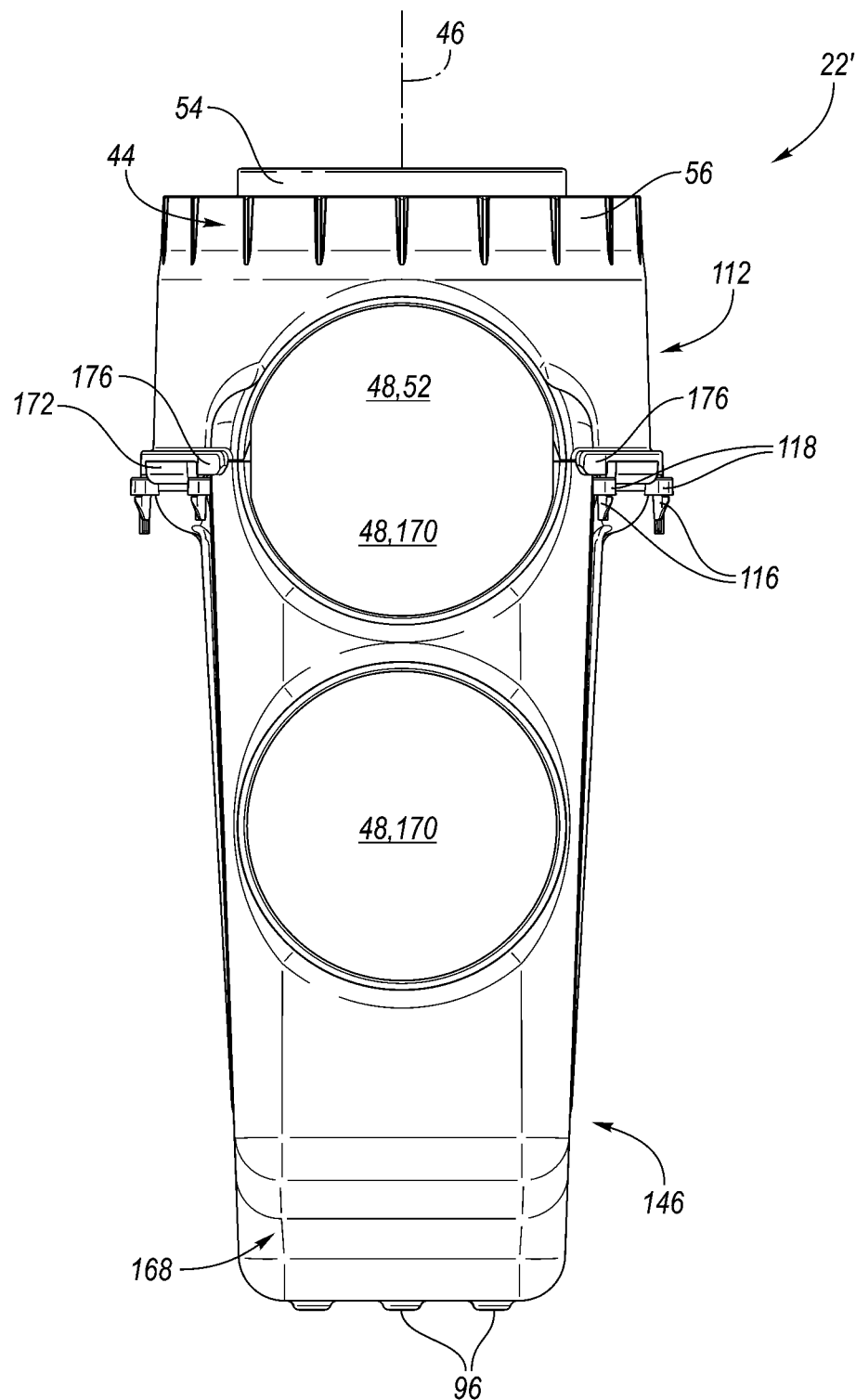
FIG. 17 is a side isometric view of the alternative configuration of the catch basin system.
Figure 18:
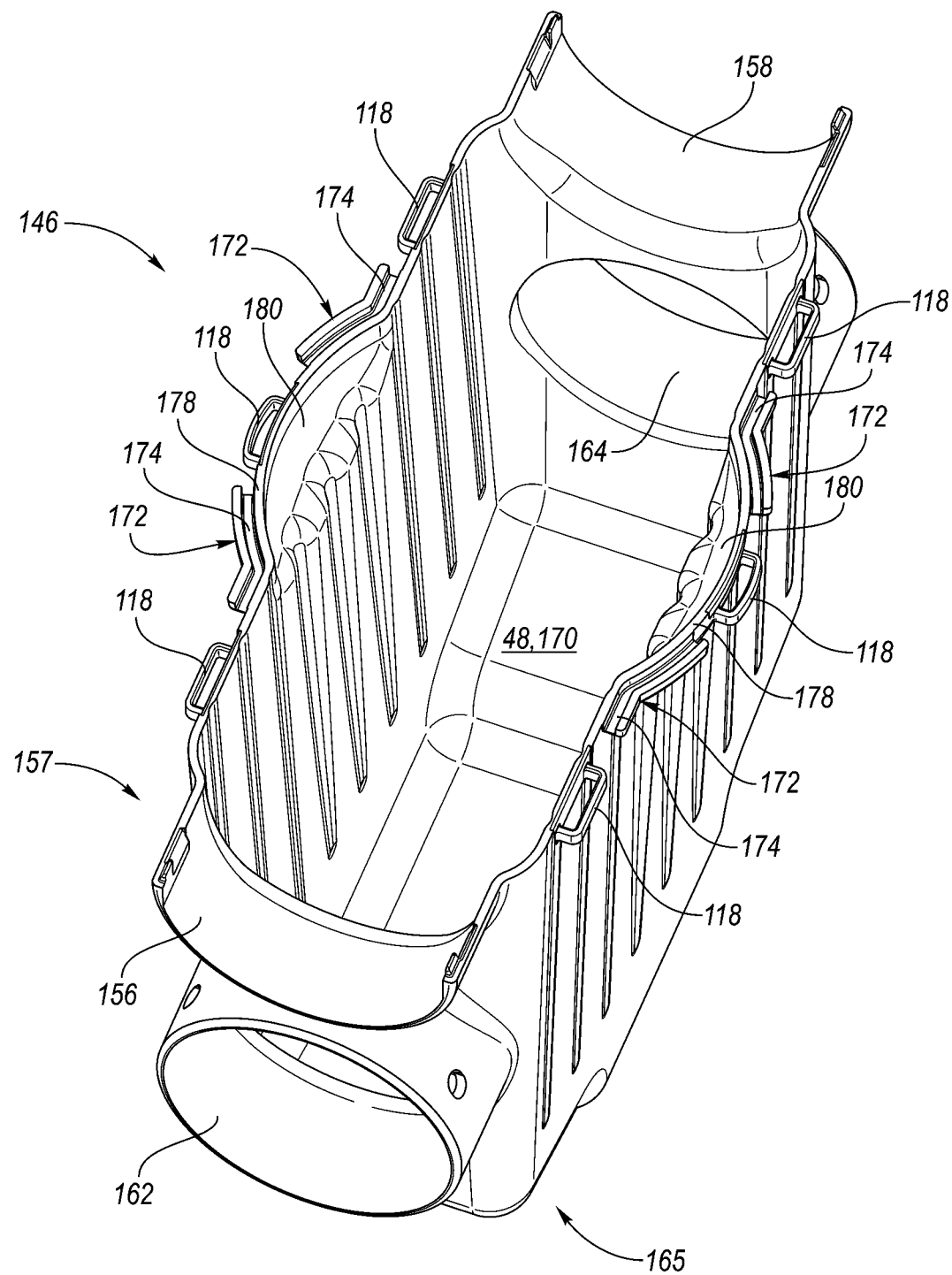
FIG. 18 is a top isometric view of a lower section of the alternative configuration of the catch basin system.
Figure 19:
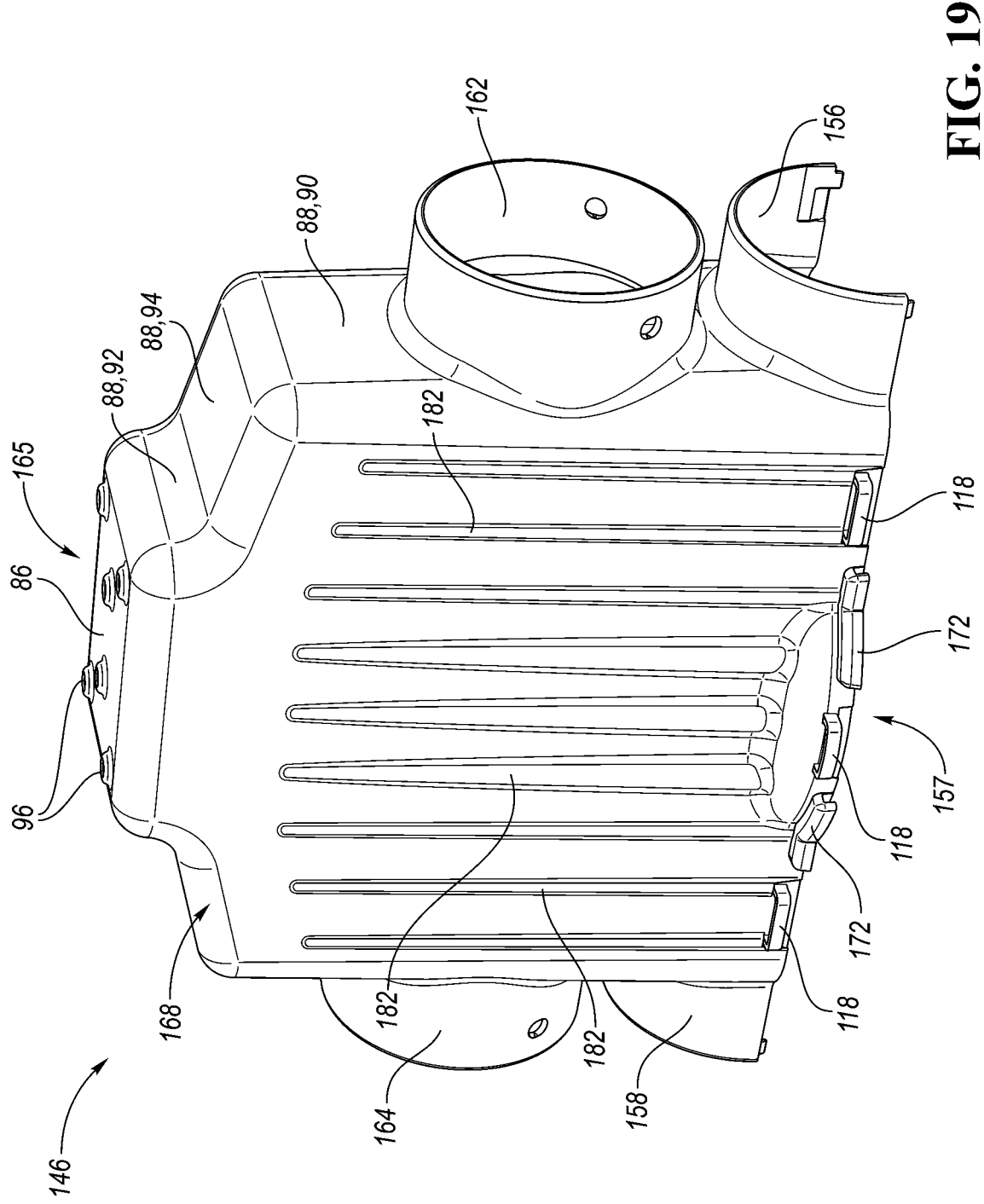
FIG. 19 is a front-bottom isometric view of the lower section of the alternative configuration of the catch basin system.

It is noted that the catch basin system 22' includes four tubes, pipes, or conduits similar to the first, second, third, and fourth tubes, pipes, or conduits 36, 40, 122, 124 as described above with respect to the catch basin system 22 as illustrated in FIGS. 11 and 12, with the exception that the two lower tubes, pipes, or conduits (e.g., the two lower tubes, pipes, or conduits that are furthest below the access port 44) are not separable into two sections or portions since the fourth integrated component 146 essentially comprises an integrated component that is a combination of the first integrated component 106 and the adapter component 120. Furthermore, the four tubes, pipes, or conduits of the catch basin system 22' may be renumbered relative to the first, second, third, and fourth tubes, pipes, or conduits 36, 40, 122, 124 of the catch basin system 22 for the case of description, but should be construed to include all of the elements, components, subcomponents, and functionality as the corresponding the first, second, third and fourth tubes, pipes, or conduits 36, 40, 122, 124 unless otherwise stated herein. Elements having common numbers shared between catch basin system 22 and catch basin system 22' should be construed to have the same properties and functionality in both configurations of the catch basin system (i.e., catch basin system 22 and catch basin system 22') unless otherwise stated here.

Also, for case of description, the fourth integrated component 146 may be referred to as the first casing or housing 146, while the second integrated component 112 may be referred to as the second casing or housing 112, or vice versa. Alternatively, the fourth integrated component 146 may be referred to as the lower casing or housing 146, while the second integrated component 112 may be referred to as the upper casing or housing 112.

The first housing 146 may be removably secured to the second housing 112. For example, the first housing 146 may be removably secured to the second housing 112 via the clipping or snapping features 114 that include the include the flexible tabs or hooks 116 that engage loops 118. The tabs or hooks 116 may be integrally formed as part of either the first housing 146 or the second housing 112 (as illustrated) while the loops 118 may be integrally formed as part of the other of the first housing 146 (as illustrated) or the second housing 112. The first housing 146 and the second housing 112 may be formed via a molding process such as injection molding and may be made from a material such as Polyvinyl Chloride (PVC) or other suitable material.

When the first housing 146 is secured to the second housing 112, the first housing 146 and the second housing 112 may collectively include and define a first tube, pipe, or conduit 148 and a second tube, pipe, or conduit 150. The first conduit 148 and the second conduit 150 may extend laterally outward from the first housing 146 and the second housing 112 collectively, or laterally outward from the catch basin system 22'.

The second housing 112 may include and define a first or upper section, portion, or region 152 of the first conduit 148. The second housing 112 may also include and define a first or upper section, portion, or region 154 of the second conduit 150. The first region 152 of the first conduit 148 and the first region 154 of the second conduit 150 may extend laterally outward from the second housing 112 in opposing directions along a lower end 151 of the second housing 112. The first region 152 of the first conduit 148 and the first region 154 of the second conduit 150 may be half-pipes that form an upper half of a tube, pipe, or conduit. The first region 152 of the first conduit 148 and the first region 154 of the second conduit 150 are open along the lower end 151 of the second housing 112, particularly when the second housing 112 is detached from the first housing 146.

The first housing 146 may include and define a second or lower section, portion, or region 156 of the first conduit 148. The first housing 146 may also include and define a second or lower section, portion, or region 158 of the second conduit 150. The second region 156 of the first conduit 148 and the second region 158 of the second conduit 150 may extend laterally outward from the first housing 146 in opposing directions along an upper end 157 of the first housing 146. The second region 156 of the first conduit 148 and the second region 158 of the second conduit 150 may be half-pipes that form an upper half of a tube, pipe, or conduit. The second region 156 of the first conduit 148 and the second region 158 of the second conduit 150 are open along the upper end 157 of the first housing 146, particularly when the first housing 146 is detached from the second housing 112. The first conduit 148 and the second conduit 150 may be aligned along axis 160.

The first housing 146 may include and define a third conduit 162 disposed below the first conduit 148. The third conduit 162 is also therefore below the first and second regions 152, 156 of the first conduit 148. The first housing 146 may also include and define a fourth conduit 164 disposed below the second conduit 150. The fourth conduit 164 is also therefore below the first and second regions 154, 158 of the second conduit 150. The third conduit 162 and the fourth conduit 164 are aligned along axis 166. Axis 160 and axis 166 may be substantially parallel to each other. Substantially parallel may refer to any incremental angle that is between exactly parallel and 15° or less from exactly parallel ((e.g., 12.5° or less from exactly parallel, 10° or less from exactly parallel, or 5° or less from exactly parallel, etc.). Axis 166 may be vertically spaced-apart from or below axis 160.

The third conduit 162 and the fourth conduit 164 may extend laterally outward from the first housing 146, or laterally outward from the catch basin system 22'. The third conduit 162 and the fourth conduit 164 are also disposed between an open end or upper end 157 of the first housing 146 and a closed or the lower end 165 of the first housing 146.

The first housing 146 further includes a sump or basin 168 that is disposed (i) between the first conduit 148 and the second conduit 150, (ii) between the third conduit 162 and the fourth conduit 164, and (iii) below the third conduit 162 and the fourth conduit 164. The sump or basin 168 should be construed to include all of the elements, components, sub-components, and functionality as basin 168 unless otherwise stated herein. For example, a bottom of the basin 168 may taper inward toward a center of the basin 168 as the basin 168 extends downward from the first, second, third, and fourth conduits 148, 150, 162, 164 toward the bottom of the basin 168. Such tapering may include the sloped regions 88 that extend upward from the flat central region 86 along the bottom of the basin 168, including the upper sloped portions 90, the lower sloped portions 92, and the intermediated sloped portions 94. The first housing 146 may further define a portion 170 of the internal cavity 48. Such a portion 170 of the internal cavity 48 may comprise a combination of the lower portion 50 and the central portion 144 of the internal cavity 48. The internal cavity 48, or more specifically the lower end of the portion 170 of the internal cavity 48 that is defined by the sump or basin 168 may be configured to catch debris therein.

Figure 7:
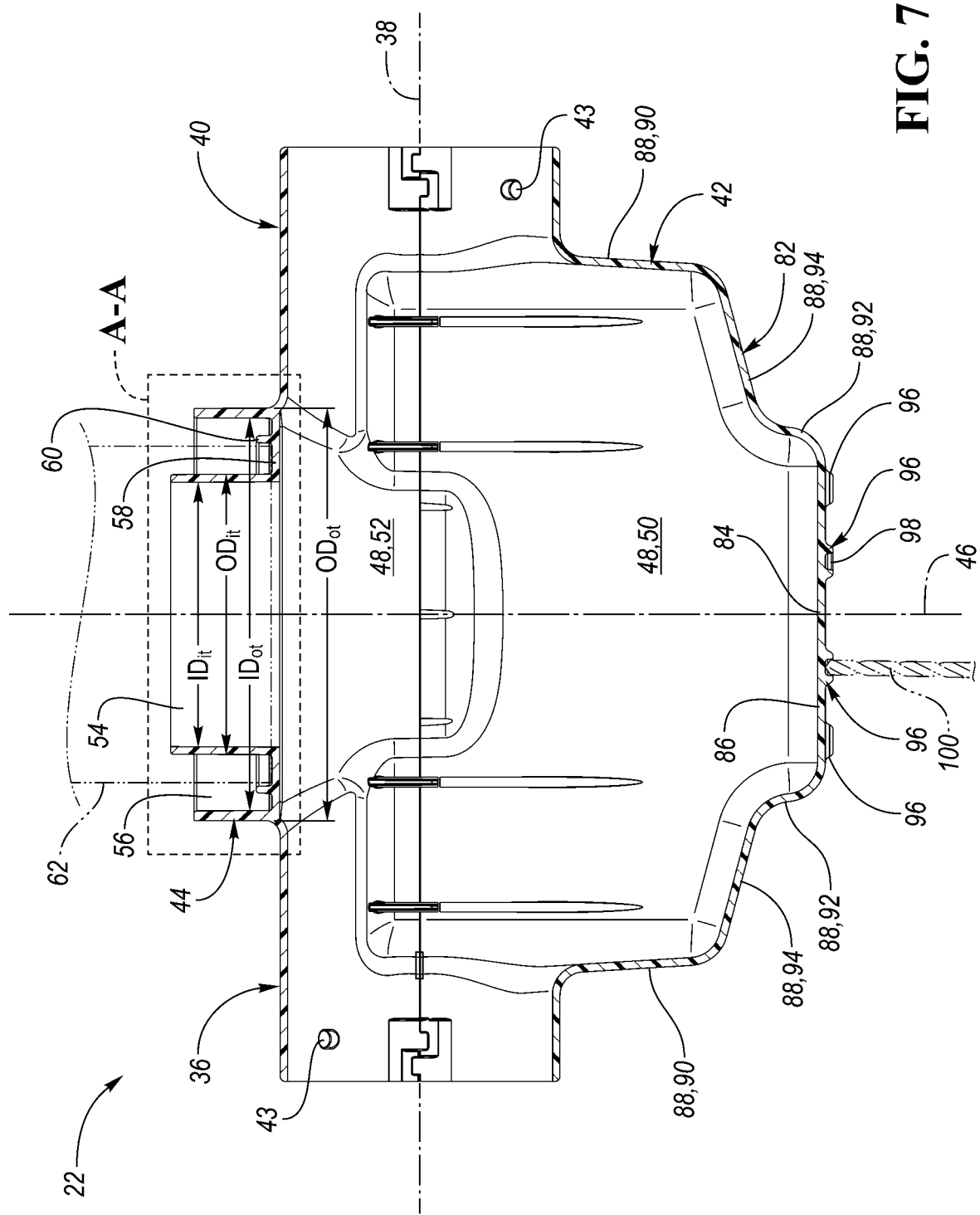
FIG. 7 is a cross-sectional view taken along line 7-7 in FIG. 5.
Figure 8:
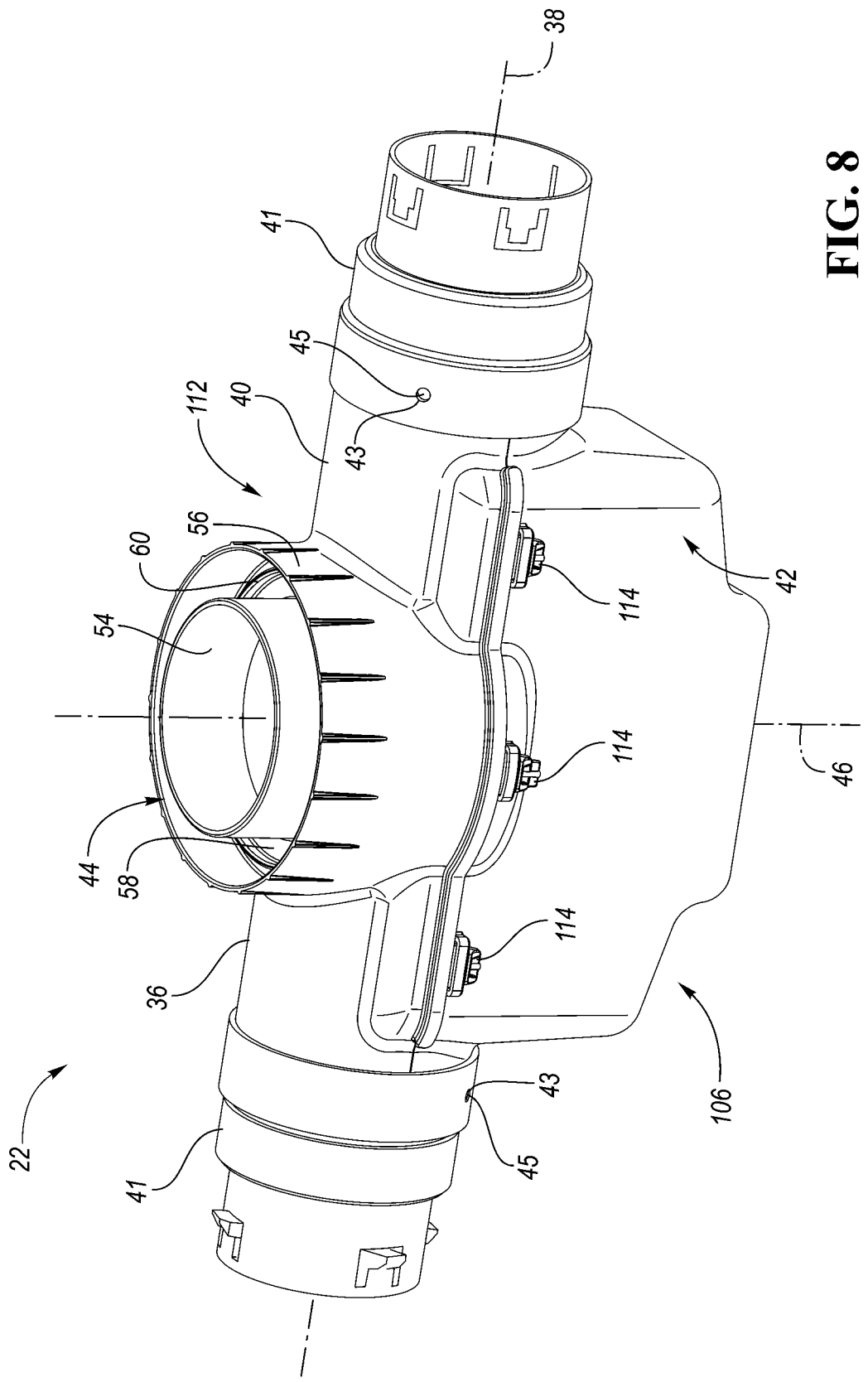
FIG. 8 is a front-top isometric view of a catch basin system having couplers attached thereto.
Figure 10:
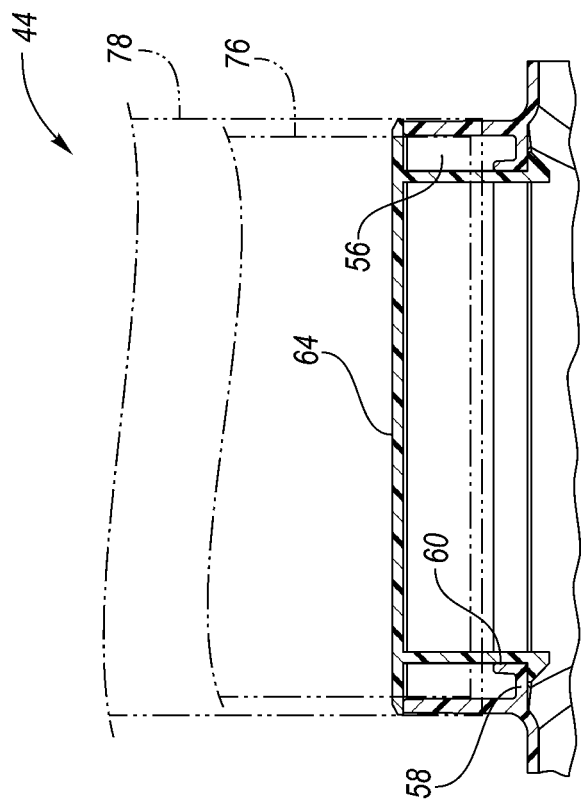
FIG. 10 illustrates area A-A in FIG. 7 with the addition of a plug of a second size.
Figure 9:
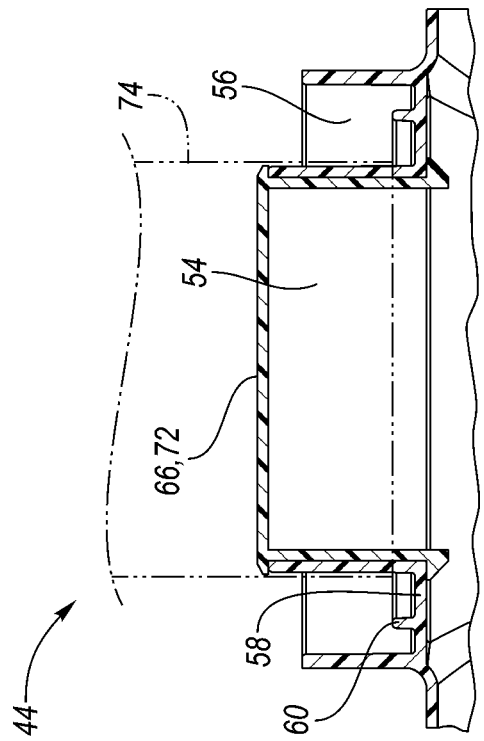
FIG. 9 illustrates area A-A in FIG. 7 with the addition of a plug of a first size.

The first housing 146, or more specifically the basin 168, may further include the protrusions 96 that extend downward from a bottom surface of the basin 168 along the flat central region 86, where the protrusions 96 may define recessed regions that extend upward, and where such recessed regions may be configured to guide drill bits for adding drain holes to the bottom surface of basin 168 (e.g., FIG. 7). Such protrusions 96 may also act as feet for supporting the catch basin system 22' in an upright position.

The first, second, third, and fourth conduits 148, 150, 162, 164 are each in fluid communication with the sump or basin 168, or more specifically are each in fluid communication with the internal cavity 48. The first and second regions 152, 156 of the first conduit 148 and the first and second regions 154, 158 of the second conduit 150 are also in fluid communication with the sump or basin 168, or more specifically are also in fluid communication with the internal cavity 48. Each of the first, second, third, and fourth conduits 148, 150, 162, 164 may function as inlets or outlets to the internal cavity 48.

The upper end 157 of the first housing 146 has one or more ledges 172 protruding outward therefrom. The ledges 172 may more specifically protrude laterally outward from the first housing 146 along the upper end 157 of the first housing 146. The ledges 172 may also protrude laterally outward from the first housing 146 transversely to the first, second, third, and fourth conduits 148, 150, 162, 164. The ledges 172 may also protrude laterally outward from the first housing 146 transversely to the first and second regions 152, 156 of the first conduit 148 and the first and second regions 154, 158 of the second conduit 150. The one or more ledges 172 may define valleys, channels, or recesses 174. The recesses 174 may face upward. A lower edge or the lower end 151 of the second housing 112 is at least partially disposed within the recesses 174 to position or locate the second housing 112 relative to the first housing 146. Central regions 176 of the lower end 151 of the second housing 112 may extend further in a downward direction relative to the first region 152 of the first conduit 148 and the first region 154 of the second conduit 150. The central regions 176 may overlap walls 178 of the first housing 146 that are adjacent to the one or more ledges 172 when the first housing 146 and the second housing 112 are secured to each other, such that bottom ends of the central regions 176 are sandwiched between the ledges 172 and the walls 178 when the first housing 146 and the second housing 112 are secured to each other. At least one of the ledges 172 may be disposed between two of the snapping features 114.

The one or more ledges 172 may be formed or defined at least partially along rounded regions 180 of the first housing 146. The rounded region 180 of the first housing 146 may partially form or define a lower end of the access port 44. The rounded region 180 is sloped downward and away from a top of the access port 44 to facilitate directing fluids downward, away from the access port 44, and toward the bottom of the sump or basin 168. Positioning the one or more ledges 172 along the rounded region 180 results in an engagement between the lower end 151 of the second housing 112 and the one or more ledges 172, which operates to center the second housing 112 relative to the first housing 146 and maintain a desired position of the second housing 112 relative to the first housing 146. Such a configuration may also increase the strength of the engagement between the second housing 112 and the first housing 146, since the lateral forces acting between the second housing 112 and the first housing 146 will be distributed in several directions.

The first housing 146 may also include beads or ribs 182 that extend downward and away from the second housing 112. Such beads or ribs 182 operate to increase the strength of the first housing 146. The ribs 182 may taper in a direction extending downward and/or away from the second housing 112.

It should be understood that the designations of first, second, third, fourth, etc. for any component, state, or condition described herein may be rearranged in the claims so that they are in chronological order with respect to the claims. Furthermore, it should be understood that any component, state, or condition described herein that does not have a numerical designation may be given a designation of first, second, third, fourth, etc. in the claims if one or more of the specific component, state, or condition are claimed.

The words used in the specification are words of description rather than limitation, and it is understood that various changes may be made without departing from the spirit and scope of the disclosure. As previously described, the features of various embodiments may be combined to form further embodiments that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. As such, embodiments described as less desirable than other embodiments or prior art implementations with respect to one or more characteristics are not outside the scope of the disclosure and may be desirable for particular applications.

What is claimed is:

1. A catch basin system comprising:
   an upper housing defining (i) an upper region of a first conduit and (ii) an upper region of a second conduit, wherein the first and second conduits are aligned along a first axis; and
   a lower housing removably secured to the upper housing and defining (i) a lower region of the of the first conduit, (ii) a lower region of the second conduit, (iii) a third conduit disposed below the first conduit, (iv) a fourth conduit disposed below the second conduit, and (v) a sump disposed between the third and fourth conduits and below the third and fourth conduits, wherein the (a) third and fourth conduits are aligned along a second axis and (b) the first, second, third, and fourth conduits are each in fluid communication with the sump.

2. The catch basin system of claim 1, wherein (i) an upper end of the lower housing has one or more ledges protruding outward therefrom, (ii) the one or more ledges define recesses, and (iii) a lower end of the upper housing is at least partially disposed within the recesses to locate the upper housing relative to the lower housing.

3. The catch basin system of claim 2, wherein the one or more ledges protrude outward from the upper end of the lower housing transversely to the first and second axes.

4. The catch basin system of claim 2, wherein the upper housing and the lower housing are secured to each other via snapping features.

5. The catch basin system of claim 4, wherein at least one of the one or more ledges is disposed between two of the snapping features.

6. The catch basin system of claim 1, wherein the lower housing has ribs that extend away from the upper housing.

7. The catch basin system of claim 1 further comprising protrusions extending downward from a bottom surface of the lower housing, wherein the protrusions define recessed regions.

8. The catch basin system of claim 1, wherein the upper housing defines an access port disposed between the first and second conduits.

9. A catch basin comprising:
   a housing defining,
     an internal cavity configured to catch debris therein,
     first and second conduit sections (i) extending laterally outward from the housing along an upper end of the housing, (ii) open along the upper end of the housing, and (iii) in fluid communication with the internal cavity and cavity, and
     first and second conduits (i) extending laterally outward from the housing, (ii) disposed between the first and second conduit sections and a bottom end of the housing, and (iii) in fluid communication with the internal cavity; and
   one or more ledges protruding outward from the upper end of the housing, wherein (i) the one or more ledges define recesses and (ii) the recesses are configured to receive a bottom edge of a second housing to locate the second housing relative to the housing.

10. The catch basin of claim 9, wherein the one or more ledges protrude outward from the upper end of the housing transversely to first and second conduit sections.

11. The catch basin of claim 9, wherein the first and second conduit sections comprise half-pipes.

12. The catch basin of claim 9, wherein the housing and the second housing are configured to engage each other via snapping features.

13. The catch basin of claim 12, wherein at least one of the one or more ledges is disposed between two of the snapping features.

14. A catch basin comprising:
   a housing (i) having upper and lower ends, (ii) defining an internal cavity configured to catch debris therein, (iii) having one or more ledges protruding outward from the upper end, wherein (a) the one or more ledges define recesses and (b) the recesses are configured to receive a bottom edge of a second housing to locate the second housing relative to the housing;
   first and second pipes (i) disposed between the upper and lower ends of the housing, (ii) extending laterally outward from the housing, and (iii) in fluid communication with the internal cavity; and
   first and second pipe sections (i) disposed above the first and second pipes, (ii) extending laterally outward from the housing along the upper end of the housing, (iii) open along the upper end of the housing, and (iv) in fluid communication with the internal cavity.

15. The catch basin of claim 14 wherein the one or more ledges protrude outward from the upper end of the housing transversely to first and second pipe sections.

16. The catch basin of claim 14, wherein the housing and the second housing are configured to engage each other via snapping features.

17. The catch basin of claim 16, wherein at least one of the one or more ledges is disposed between two of the snapping features.

18. The catch basin of claim 14, wherein the first and second pipe sections comprise half-pipes.

19. A catch basin comprising:
   a housing defining,
      an internal cavity configured to catch debris therein, and
      first and second conduit sections (i) extending laterally outward from the housing along an upper end of the housing, (ii) open along the upper end of the housing, and (iii) in fluid communication with the internal cavity, wherein the first and second conduit sections comprise half-pipes; and
   one or more ledges protruding outward from the upper end of the housing, wherein (i) the one or more ledges define recesses and (ii) the recesses are configured to receive a bottom edge of a second housing to locate the second housing relative to the housing.

20. A catch basin comprising:
   a housing defining,
      an internal cavity configured to catch debris therein, and
      first and second conduit sections (i) extending laterally outward from the housing along an upper end of the housing, (ii) open along the upper end of the housing, and (iii) in fluid communication with the internal cavity; and
   one or more ledges protruding outward from the upper end of the housing, wherein (i) the one or more ledges define recesses and (ii) the recesses are configured to receive a bottom edge of a second housing to locate the second housing relative to the housing, and wherein the housing and the second housing are configured to engage each other via snapping features.

* * * * *